United States Patent [19]

Patel

[11] Patent Number: 5,166,998
[45] Date of Patent: Nov. 24, 1992

[54] OPTICAL RIBBON CABLE COMPONENT
[75] Inventor: Naren I. Patel, Hickory, N.C.
[73] Assignee: Siecor Corporation, Hickory, N.C.
[21] Appl. No.: 839,153
[22] Filed: Feb. 21, 1992
[51] Int. Cl.⁵ .............................................. G02B 6/44
[52] U.S. Cl. .................................................... 385/114
[58] Field of Search ................ 385/114, 127, 128, 141

[56] References Cited

U.S. PATENT DOCUMENTS

| | | | |
|---|---|---|---|
| 4,329,018 | 5/1982 | Dubost | 385/114 X |
| 4,709,983 | 12/1987 | Plessner et al. | 385/114 X |
| 4,709,984 | 12/1987 | Oestreich et al. | 385/114 |
| 4,804,245 | 2/1989 | Katayose et al. | 385/114 X |
| 4,878,732 | 11/1989 | Rohner et al. | 385/114 X |
| 4,895,427 | 1/1990 | Kraft | 350/96.23 |
| 4,952,020 | 8/1990 | Huber | 385/114 |
| 4,983,013 | 1/1991 | Dotzer et al. | 350/96.23 |
| 4,984,859 | 1/1991 | Fujigaki et al. | 385/114 |
| 4,984,869 | 1/1991 | Roche | 350/96.23 |
| 4,997,257 | 5/1991 | Spedding | 385/114 X |
| 5,042,892 | 8/1991 | Chiu et al. | 385/114 |
| 5,071,221 | 12/1991 | Fujitani et al. | 385/114 X |

OTHER PUBLICATIONS

Japanese unexamined Patent Publication No. 58(1983)-221713, Dec. 9, 1983.

Primary Examiner—Akm E. Ullah
Attorney, Agent, or Firm—Roy B. Moffitt

[57] ABSTRACT

An optical cable component made up of an elongated flexible substrate, having first and second groups of plastic coated optical fibers, the first group being removably affixed to a first surface of the substrate and the surface opposite from the first group on its opposite surface being essentially unoccupied. The second group of plastic coated optical fibers are removably affixed to the second surface of the substrate and the surface opposite from the second group being essentially unoccupied. Between the first and second groups of plastic coated optical fibers, there is delimited an unoccupied portion on both surfaces essentially equal to the diameter of one of the plastic coated optical fibers. Each group of plastic coated optical fibers bear an indicia for identification purposes.

22 Claims, 3 Drawing Sheets

FIG. IA
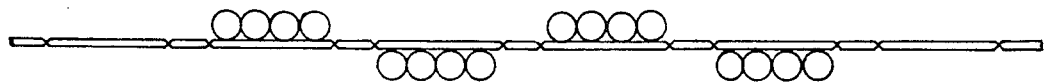
FIG. IB
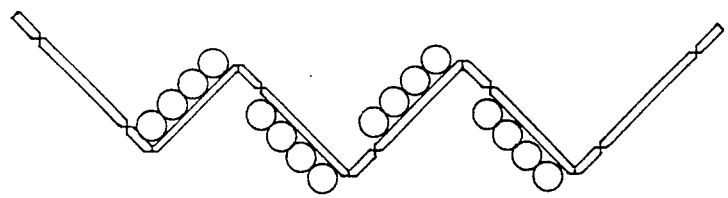
FIG. IC
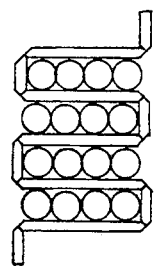

OPTICAL RIBBON CABLE COMPONENT

BACKGROUND OF THE INVENTION

One trend in the optical cable art is to use more and ribbon cables. Ultimately, these ribbon cables must be connectorized and spliced. Thus, the optical fibers within the cable must be arranged and marked in an organized, identifiable, compact and easily accessible manner. Because space within a cable is restricted, utilization of such space is a prime consideration in cable design. Efficient utilization of cable space can be best achieved if the fibers of the cable were properly organized, anything less makes the task of finding and working with the right fiber most difficult. Coloring of the plastic coating of nearly every fiber, separating repeat colors into separate groups or bundles, and color coding each group or bundles in a distinguishable manner, are some of the prior art techniques presently employed that permit a craftsman to correctly identify an individual fiber(s) for splicing or connectorizing.

High optical fiber count cables are becoming more and more popular. As the fiber count goes up, so does the complexity of grouping and color coding fibers. Many small size or narrow ribbons (low fiber count) in a cable having many fibers in the aggregate not only create a difficult situation because separation and identification are desired, but movement (bending) of ribbon bundles create strain in the optical fibers and can induce unwanted attenuation and mechanical properties. Furthermore, a large or wide ribbon, not having a appropriate separation means is difficult to connectorize in practice. As a result, prior art practice has been to limit ribbons to generally no more than eight fibers; however, in some cases, sixteen fibers have been used. To solve the above stated problems, there is needed a ribbon cable component that can be folded upon itself, much like an accordion, bear identifying indicia to readily identify a given group and any given group be easily separable from adjoining group(s). It is towards an optical cable component having such features that this invention is directed.

BRIEF DESCRIPTION OF THE INVENTION

The optical fiber ribbon component of the instant invention is composed of a flexible web or substrate on both sides of which are groups of plastic coated optical fibers adhesively, but removably affixed. The opposite surface of the web on which a given group is affixed is unoccupied by fibers and adhesive and the area between the terminal fiber of one group and the most adjacent terminal fiber of the next group (on the opposite surface) either contains or is delimited by serrations or indentations. The area's width is essentially equal to the diameter of a plastic coated fiber. The above described fiber optical cable component can be collapsed onto itself whereby the planes delimited by the optical fibers of one group are at an acute, obtuse or right angle to the plane delimited by the optical fibers of the adjacent group; or, the planes can be further compacted so that they are spaced apart from, but essentially parallel to one another, i.e., in a stacked arrangement. In either case, the web can be compacted and used as a cable component. When a terminal portion of the cable is stripped in preparation for applying connectors or for splicing, the web can be unfolded, the individual groups identified by an identifying indicia and separated from one another employing serrations in the web or substrate. Such features make it craft friendly.

BRIEF DESCRIPTION OF THE DRAWINGS

FIG. 1A is a front elevation of a substrate having indentations or serrations therein on which there is removably affixed groups of plastic coated optical fibers.

FIG. 1B is the substrate and plastic coated optical fibers thereon of FIG. 1A partially collapsed along the serrations or indentations in the substrate.

FIG. 1C is the substrate and plastic coated optical fibers thereon of FIG. 1A fully collapsed into a rectangular shaped mass along the serrations or indentations in the substrate.

DETAILED DESCRIPTION OF THE INVENTION

Figure 2:
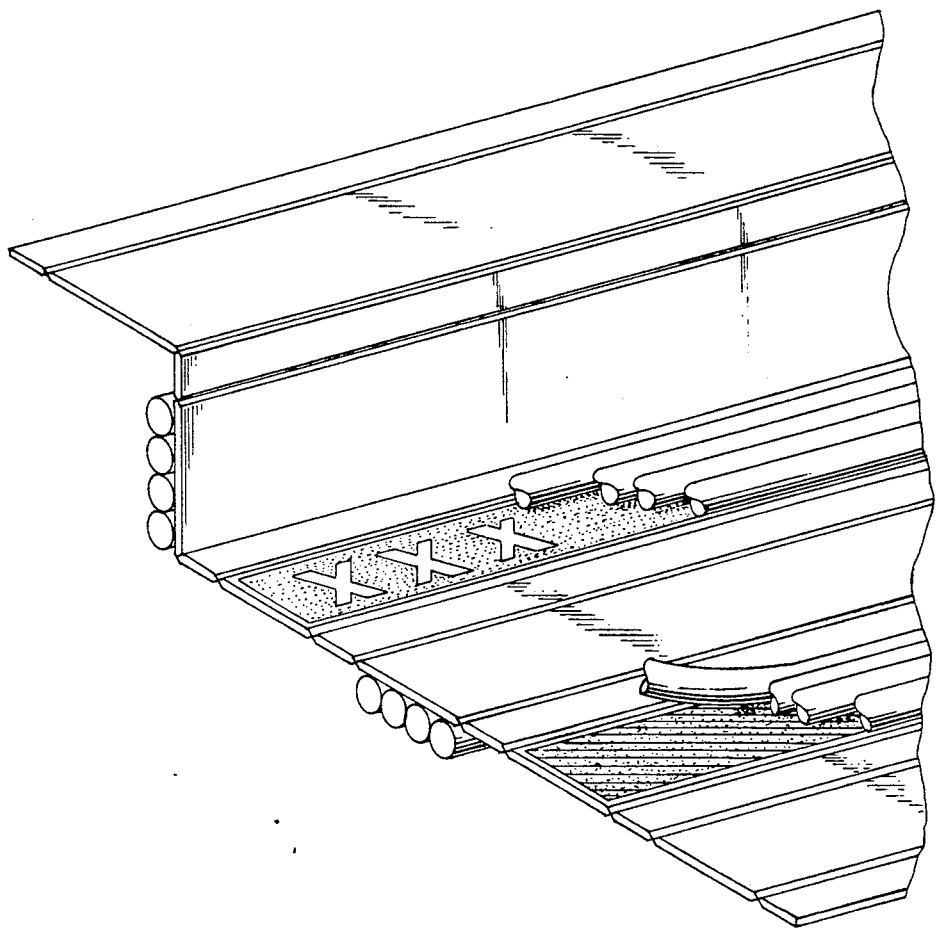
FIG. 2 is an isometric view of the substrate and affixed groups of plastic coated optical fibers of FIGS. 1A, 1B, and 1C showing further group identifying indicia of color and "X" marks.

Shown generally by element 1, in FIG. 1A is the invention composed of a substrate 2 on which there are a plurality of groups of plastic-coated optical fibers 4 and 4'. Group 4 is on the upper surface and 4' is on the lower or opposite surface of substrate 2. Indentations or serrations 5 delimit an area between groups in which plastic-coated, optical fiber group 4' and 4 are removably disposed. Plastic-coated optical fiber group 4 is on the upper surface and plastic-coated optical fiber group 4' is on the lower surface of substrates, the upper surface opposite that of group denoted by the element 4' is unoccupied by either fibers or adhesive. Likewise, the lower surface of substrate 2 opposite group 4 of the plastic coated optical fiber group 4 is unoccupied. Between a left terminal fiber of group 4' and the right terminal fiber of group 4 is an a substrate area denoted by the element 3, substantially equal to in width to the diameter of one of the optical fibers in either group 4 or 4'. Area 3 is laterally delimited by serrations or indentations 5. They allow the substrate to be collapsed into a rectangular configuration, as shown in FIG. 1C. Serrations or indentations 5 can also be placed in the area denoted by element 3 if desired (not shown).

Figure 3:
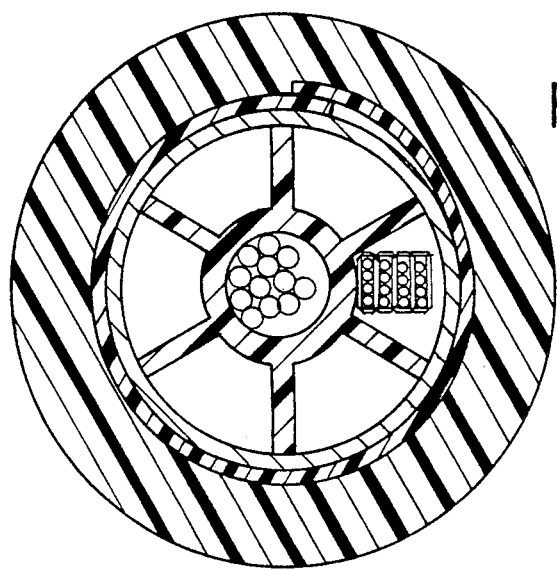
FIG. 3 is a cross sectional view of a prior art slotted core cable employing the optical ribbon cable component of FIGS. 1A, 1B, 1C and/or 2.

In FIG. 1B, element 1 is shown as partially collapsed, the plane delimited by plastic coated optical fibers of group 4 being shown at essentially a right angle to the plane delimited by the plastic coated optical fibers of group 4'. Obviously, these two planes can be juxtaposed, one to another so that the angle is anywhere from a right to an acute or an obtuse angle, or an angle equal to 180 degrees as shown in FIG. 1A. In FIG. 1C, the plane delimited by optical fibers 4 and 4' are spaced apart, but essentially parallel to each other, forming a compact unit which can be readily inserted into a slotted core type optical cable configuration as shown by element 9 of FIG. 3, or placed in a tube 16 which can be stranded about a strength member 14, jacket 15 is extruded there over as shown in FIG. 4.

Other embodiments of the invention are shown in FIG. 2, with like numbers indicating like elements as previously discussed. Element 6 represents an adhesive which affixes optical fibers 4 and 4' to substrate 2. Adhesive 6 has properties so that the optical fibers are removably affixed as shown in FIG. 2. Furthermore, adhesive 6 may bear indicia 7 which would identify a given group as desired. As shown by element 8, the adhesive could be of a specific color. It is obvious that the color and an indicia could be combined to form an additional means of identification. Optical ribbon cable components shown by element 1 in FIGS. 1A, 1B, 1C, and 2 can be used in a slotted core ribbon cable configuration as shown by element 9 in FIG. 3, where element 1 denotes the optical ribbon cable component collapsed upon itself as shown in FIG. 1C and disposed in a cavity, delimited by spokes 13 and central ring member 12. In central ring member 12, there may be disposed strength elements 14 such as GRP, Kevlar or steel strands. Tape, or some other wrapping or extrusion may be used to cover spokes 13 and complete the cavity in which element 1 is disposed. In such cavity, a grease may be disposed if desired (not shown). Around member 11 is extruded jacket 10, completing the slotted core ribbon cable structure.

Figure 4:
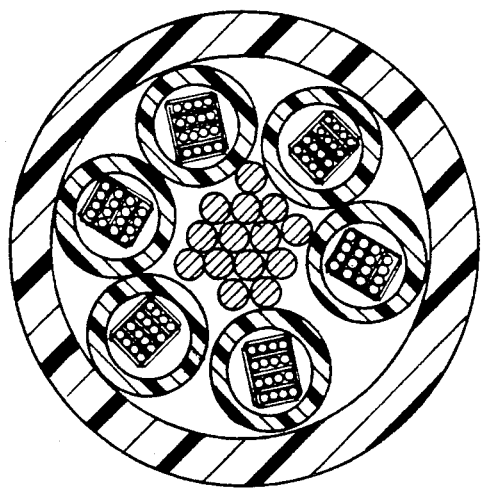
FIG. 4 is a cross sectional view of an optical cable employing the invention in which a plurality of tubes, in which the invention is disposed, is stranded about a central strength member to form a core circumscribed by a jacket.

In FIG. 4, as shown by element 15, a plurality of tubes 16 are shown in which there is disposed element 1 as shown in FIG. 1C, i.e., collapsed upon itself to form a rectilinear body. The volume of tube 16 not otherwise occupied by the optical ribbon cable component 1 may be filled with grease, or other such water repellant lubricant, if desired (not shown). Tube 16 containing an optical ribbon cable component is stranded about strength member 14 to form a core and about the core can be extruded in a jacket 10, completing another cable structure in which the intended invention can be used. Strength member 14 can be the steel, GRP, or Kevlar as desired.

Substrate 2 can be made of any suitable materials such as plastic or paper and the serrations and indentations therein can be accomplished by a well known prior art apparatus. Such serrations or indentations are obviously for the purpose of physically separating one group from another, by tearing the substrate along these lines of weakness. Elements 6 or 8 can be modified latex of polybutene based adhesive depending on the degree of adhesiveness desired.

In all cases, it is to be understood that the above described embodiments are illustrative of one of many possible specific embodiments which may represent the principals of my invention. Numerous and various other embodiments can be devised readily in accordance with these principals by those skilled in the art without departing from the spirit and scope of my invention.

What is claimed is:

1. An optical cable component comprising:
   (a) an elongated flexible substrate having first and second surfaces;
   (b) a first group of plastic coated optical fibers, including a first and last plastic coated optical fiber, removably affixed to said first surface, said second surface opposite from said first group being essentially unoccupied;
   (c) a second group composed of plastic coated optical fibers, including a first and last plastic coated optical fiber, removably affixed to said second surface, said first surface opposite from said second group being essentially unoccupied; and,
   (d) said last plastic coated optical fiber of said first group and said first plastic coated optical fiber of said second group delimit an unoccupied portion of both surfaces of said web essentially equal to the diameter of one of said plastic coated optical fibers.

2. The optical cable component of claim 1 wherein a plane delimited by the plastic coated optical fibers of said first group are disposed at an acute angle to a plane delimited by the plastic coated optical fibers of said second group.

3. The optical cable component of claim 1 wherein a plane delimited by the plastic coated optical fibers of said first group is essentially parallel to a plane delimited by the plastic coated optical fibers of said second group.

4. The optical cable component of claim 1 wherein said first surface occupied by said first group is marked by a first identifying indicia.

5. The optical cable component of claim 4 wherein said second surface occupied by said second group is marked by a second identifying indicia.

6. The optical cable component of claim 1 wherein said first group is removably affixed to said first surface by an adhesive having a first color.

7. The optical cable component of claim 6 wherein said second group is removably affixed to said second surface by an adhesive having a second color.

8. The optical cable component of claim 1 further including preformations in said substrate disposed in that portion of the web delimited by the last plastic coated optical fiber of the first group and the first plastic coated optical fiber of the second group.

9. The optical cable component of claim 8 wherein said first surface occupied by said first group is marked by a first identifying indicia.

10. The optical cable component of claim 8 wherein said second surface occupied by said second group is marked by a second identifying indicia.

11. The optical cable component of claim 8 wherein said first group is removably affixed to said first surface by an adhesive having a first color.

12. The optical cable component of claim 11 wherein said second group is removably affixed to said second surface by an adhesive having a second color.

13. The optical cable component of claim 1 wherein said first group is removably affixed to said first surface by an adhesive and the second surface of said web opposite from said first group is adhesive free.

14. The optical cable component of claim 13 wherein the second group is removably affixed to said second surface by an adhesive and the first surface of said web opposite from said second group is adhesive free.

15. The optical cable component of claim 13 wherein said first surface occupied by said first group is marked by a first identifying indicia.

16. The optical cable component of claim 15 wherein the second surface occupied by said second group is marked by an identifying indicia.

17. The optical cable component of claim 15 wherein said first identifying indicia is a first colored adhesive.

18. The optical cable component of claim 16 wherein the identifying indicia is a second colored adhesive.

19. The optical cable component of claim 13 further including perforations in said web located in that portion of the web delimited by the last plastic coated optical fiber of the first group and the first plastic optical fiber of the second group.

20. The optical cable component of claim 14 further including perforations in said web located in that portion of the web delimited by the last plastic coated optical fiber of the first group and the first plastic coated optical fiber of the second group.

21. An optical cable comprising a core comprising one or more tubes in which an optical cable component is disposed and a jacket circumscribing said one or more cores, said optical cable component comprising:
 (i) an elongated flexible substrate having first and second surfaces;
 (ii) a first group of plastic coated optical fibers, including a first and last plastic coated optical fiber, removably affixed to said first surface, said second surface opposite from said first group being essentially unoccupied;
 (iii) a second group composed of plastic coated optical fibers, including a first and last plastic coated optical fiber, removably affixed to said second surface, said first surface opposite from said second group being essentially unoccupied; and
 (iv) said last plastic coated optical fiber of said first group and said first plastic coated optical fiber of said second group delimit an unoccupied portion of both surfaces of said web essentially equal to the diameter of one of said plastic coated optical fibers.

22. An optical cable comprising a core comprising one or more open top elongated containers in which an optical cable component is disposed and a jacket circumscribing said one or more open top containers, said optical cable component comprising:
 (i) an elongated flexible substrate having first and second surfaces;
 (ii) a first group of plastic coated optical fibers, including a first and last plastic coated optical fiber, removably affixed to said first surface, said second surface opposite from said first group being essentially unoccupied;
 (iii) a second group composed of plastic coated optical fibers, including a first and last plastic coated optical fiber, removably affixed to said second surface, said first surface opposite from said second group being essentially unoccupied; and,
 (iv) said last plastic coated optical fiber of said first group and said first plastic coated optical fiber of said second group delimit an unoccupied portion of both surfaces of said web essentially equal to the diameter of one of said plastic coated optical fibers.

* * * * *